Dec. 23, 1952      L. R. LARSEN      2,622,895
BEDFRAME CONSTRUCTION FOR AUTOMOTIVE TRAILERS
Filed Feb. 20, 1951      2 SHEETS—SHEET 1
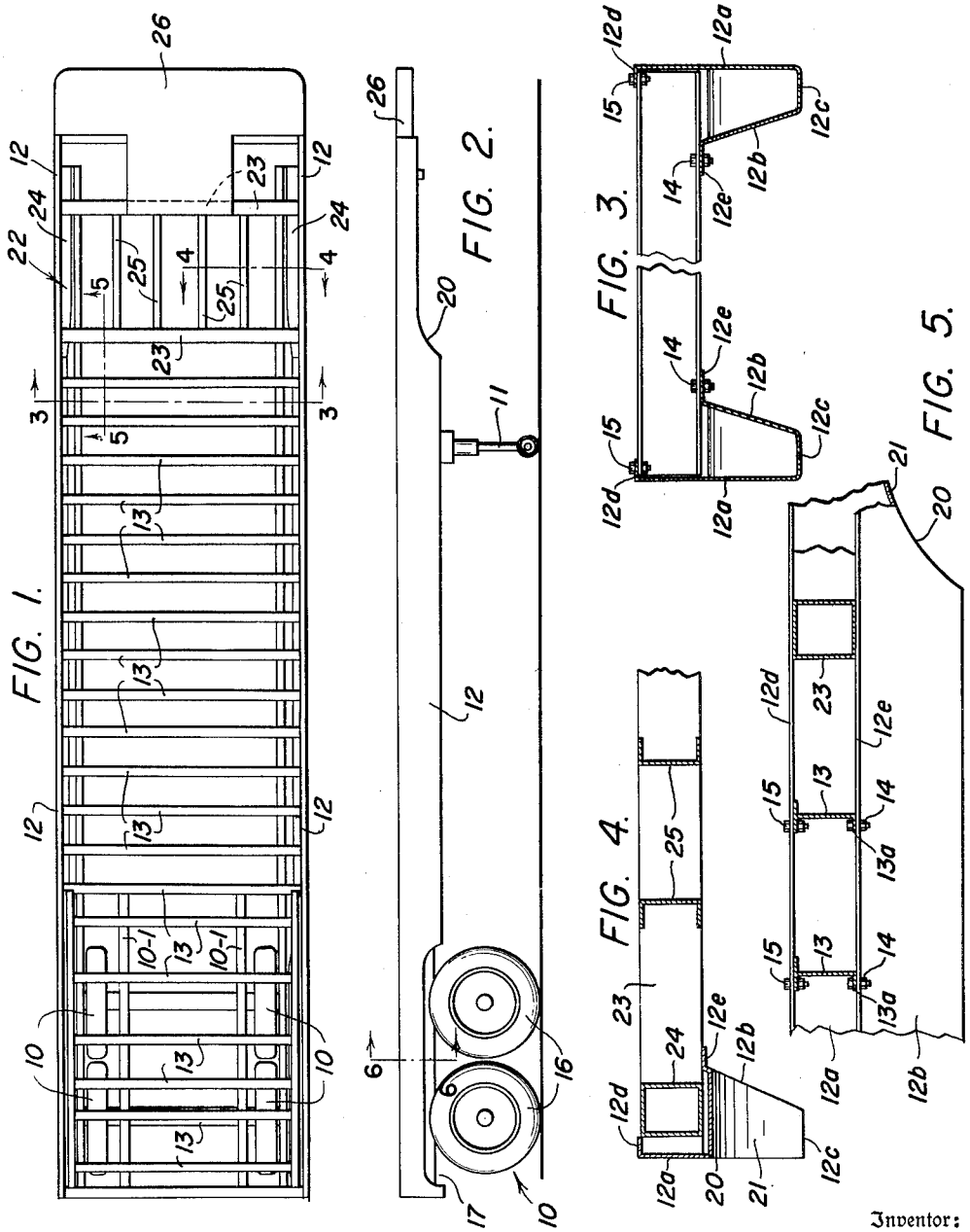
Inventor:
LARS R. LARSEN,
By [signatures]
Attorney Dec. 23, 1952      L. R. LARSEN      2,622,895
BEDFRAME CONSTRUCTION FOR AUTOMOTIVE TRAILERS
Filed Feb. 20, 1951      2 SHEETS—SHEET 2
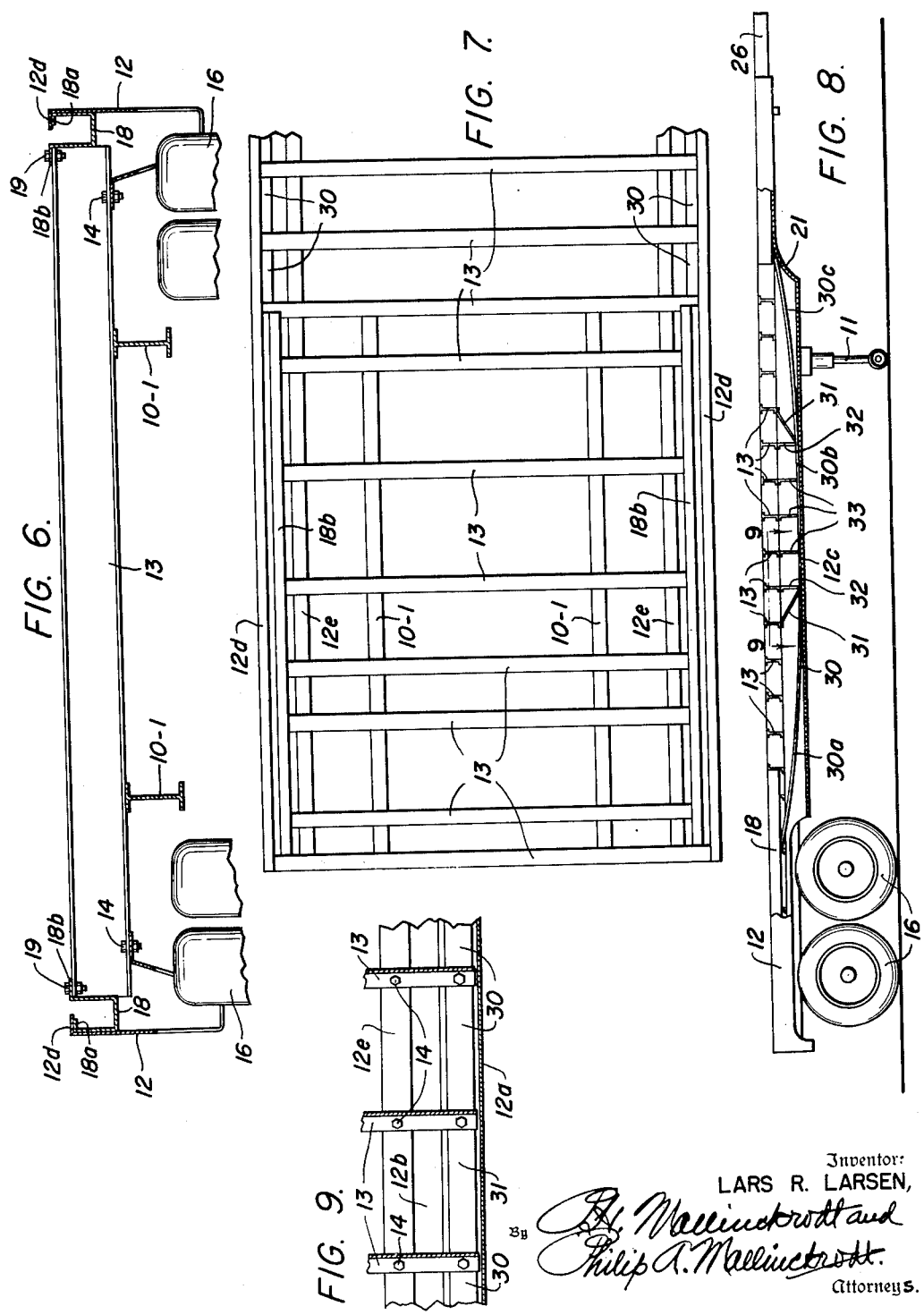
Inventor:
LARS R. LARSEN,
By R. Mallinckrodt and
Philip A. Mallinckrodt.
Attorneys.

Patented Dec. 23, 1952

2,622,895

UNITED STATES PATENT OFFICE 2,622,895

BEDFRAME CONSTRUCTION FOR AUTOMOTIVE TRAILERS

Lars R. Larsen, Salt Lake City, Utah

Application February 20, 1951, Serial No. 211,937

12 Claims. (Cl. 280—106)

This invention relates to the construction of automotive trailers, and especially, though not exclusively, to those commonly utilized for the transportation of freight over highways.

The invention is directed particularly to the construction of bed frames for such trailers, and is applicable to both so-called "full trailers" and "semi-trailers," the latter being partially supported as well as pulled by respective tractor units. The bed frame of the invention may be employed as an open bed trailer for the transportation of bulky items, such as structural steel and various heavy machinery, or may have a suitably closed body erected thereon for the transportation of smaller articles of merchandise.

A primary consideration in the construction of automotive trailers for the transportation of freight is the elimination of weight, since any reduction in weight of the trailer itself means that a greater pay load can be carried on any given trip. Thus, a manufacturer of automotive trailers who is able to offer to the trade a unit having adequate structural strength, yet extraordinary lightweight, is in a superior competitive position so far as sale of his product is concerned, and those truckers who purchase his trailer units are in a more favorable competitive position with respect to other truckers so far as the transportation of freight is concerned.

Automotive trailers as conventionally constructed embody a relatively heavy structural steel bed frame or chassis, whether the unit is of open bed type or possesses a body. However, in at least one instance, trailers possessing bodies are being presently constructed along structural principles adapted from the aircraft industry. As so constructed, the bed frame, as such, is eliminated, and certain structural elements thereof are incorporated in the body proper to provide what is essentially an integral tube whose several walls reinforce each other and collectively supply the necessary structural strength for the unit as a whole. These closed body units are generally constructed of structural aluminum, and are extremely lightweight. However, such construction is not adaptable to an open bed unit.

Accordingly, a principal object of the present invention is to provide a bed frame construction for automotive trailers, which may be utilized as an open bed unit or which may possess any desired type of body, such bed frame construction having requisite structural strength and load supporting capacity, yet being considerably lighter in weight than conventional constructions, and being capable of economical production.

To these ends the construction of the invention embodies a pair of specially formed, longitudinally extending, load-carrying structural members, which may, to borrow a word from the aircraft industry, be appropriately termed "longérons." These are spaced apart by the desired width of the unit, and are tied together by a series of transverse beams mutually spaced apart along the length of the unit on respective centers determined by the nature of the particular unit concerned. Such transverse beams serve, in effect, as joists for the superficial floor of the trailer bed.

At present it is preferred that these longitudinal structural members, or longérons, be steel plate broken and bent to shape, though they may be pressed, rolled, or extruded to shape from ordinary steel, stainless steel, or a lightweight structural metal, such as aluminum or an alloy thereof.

Each such member has two upstanding longitudinal webs mutually spaced apart by a longitudinally interconnecting base web. One of the upstanding webs is deeper than the other, preferably by a distance adapted to accommodate ends of the several transverse beams of the trailer bed frame. Thus, the upper edge portion of the upstanding web of less depth becomes a seat which receives and supports the transverse beams in their mutually spaced relationship, while the upper portion of the other upstanding web preferably wholly, and, in any event, partially sheathes corresponding ends of such beams.

The upstanding web of greater depth is preferably vertically disposed in the bed frame construction, to provide a lateral outer wall therefor, while that of lesser depth is preferably angularly related thereto, diverging therefrom as it rises from the base web, so as to increase the shouldered receiving area for the transverse beams. The base web is preferably horizontally disposed.

Both of the upstanding webs preferably have transverse flanges extending from their upper edges inwardly of the bed frame, thereby providing extended bearing areas for the transverse beams, one below, on which such beams rest, and one overlapping the beams, above. The beams and longérons are preferably tied together by bolts or other fastening devices passing through the bearing flanges when structural aluminum or the like is used for such beams or for such longérons, or for both, or by welding at such bearing flanges when steel is employed for both.

Further objects and features of the invention will become apparent as the description proceeds with respect to a presently preferred embodiment of the invention exemplifying the inventive concepts involved, the same being illustrated in the accompanying drawings as applied to a semi-trailer.

In the drawings:

Fig. 1 represents a top plan view of a semi-trailer having a bed frame constructed in accordance with the invention, no superficial floor being shown;

Fig. 2, a side elevation;

Fig. 3, a transverse vertical section taken on the line 3—3 of Fig. 1 and drawn to an enlarged scale, the center portion being broken out for convenience of illustration;

Fig. 4, a fragmentary, transverse, vertical section taken on the line 4—4 of Fig. 1 and drawn to the scale of Fig. 3;

Fig. 5, a fragmentary, longitudinal, vertical section taken on the line 5—5 of Fig. 1, and drawn to the scale of Figs. 3 and 4;

Fig. 6, a fragmentary vertical section taken on the line 6—6 of Fig. 2, and considerably enlarged;

Fig. 7, a fragmentary top plan corresponding to the left-hand portion of Fig. 1, but drawn to a considerably enlarged scale;

Fig. 8, a side elevation partly in vertical section taken longitudinally through the near longéron, showing how additional truss structure may be incorporated with the longérons in certain heavy duty embodiments of the invention; and Fig. 9, a fragmentary horizontal section taken on the line 9—9 of Fig. 8 and drawn to an enlarged scale.

Referring to the drawings: As illustrated in Figs. 1 and 2 the trailer bed frame of the invention is adapted to be mounted on a customary undercarriage, for example that indicated generally 10, which is a type presently in widespread use throughout this country.

While a semi-trailer utilizing a dual wheel tandem undercarriage is illustrated, it will be readily apparent that other types in common use may be also employed. As shown, the semi-trailer unit is detached from the tractor unit, and the front, or tractor-supported end thereof, is supported by the usual temporary dolly 11.

The bed frame comprises a pair of special, longitudinal, structural members, or longérons, indicated 12, respectively, disposed in mutually spaced, side-by-side, parallel relationship, and extending substantially the full length of the semi-trailer unit. Extending transversely of the unit and between such longérons 12 in mutually spaced relationship longitudinally of the unit, and serving to rigidly tie such longérons together, are a plurality of beams 13.

Each of the longérons 12 has an outer upstanding longitudinal web 12a, an inner upstanding longitudinal web 12b, and a transverse longitudinal base web 12c which is here shown as interconnecting the said upstanding webs 12a and 12b at the lower longitudinal edges thereof. The outer upstanding web 12a is preferably vertically disposed in the trailer bed frame, and is relatively deep compared to the total width of the longéron member 12 and to the depth of the inner upstanding web 12b, thereby establishing a total depth for such member which might be said to place it in the category of a deep girder. It advantageously makes a 90 degree angle with the base web 12c, and provides an outer lateral wall for the trailer bed frame.

The inner web 12b has a depth which is less than that of the outer web 12a by a distance, in preferred embodiments, substantially equal to the depths of the several transverse beams 13, and rises from its joinder with the transverse base web 12c at advantageously an obtuse angle therewith, so as to diverge relative to the outer web 12a and provide an extended receiving shoulder for ends of the transverse beams 13.

An inturned flange 12d is preferably provided along the upper edge of the outer web 12a, and a similar flange 12e along the upper edge of the inner web 12b, thereby providing extended bearing areas for the several transverse beams 13.

The beams 13 may be of any appropriate structural formation, but preferably have the cross sectional configuration illustrated in Fig. 5, that is to say, approximately a T formation having a single foot flange 13a. They rest upon the flanges 12e of the respective longérons 12, and are directly supported by the inner upstanding webs 12b from which such flanges 12e extend. They are secured to the bearing flanges 12e, preferably by bolts, as at 14, when the material of such beams is aluminum or other similar lightweight metal, or by welding when the material is steel.

As so positioned, the transverse beams 13 desirably bear snugly against the under sides of the upwardly disposed, inturned, bearing flanges 12d of the respective longérons, and are secured thereto by means of bolts 15.

The major length of the trailer bed frame intermediate opposite ends thereof is made up of beams 13 carried by and secured at their ends to the longérons 12 in the manner described above, the same being preferably spaced uniformly.

The portion of the trailer bed frame disposed over an undercarriage 10 preferably has its transverse beams 13 somewhat differently spaced, as illustrated in Fig. 1, to better distribute load to the longitudinal frame members 10—1, Fig. 6, of such undercarriage. It should be noted in this connection, that the lower portions of the respective longérons lying over the outer wheels 16 of the undercarriage are desirably cut away, as at 17, Fig. 2, to accommodate such wheels.

In order to strengthen the rear cut-away portions of the respective longérons 12 which lie above the undercarriage 10, and for resisting the localized moments created by reason of the articulative character of such undercarriage, respective reinforcing structural members 18 are inset into longitudinal channel recesses formed within the upper portions of the respective longérons 12 by shortening the several transverse beams 13 along this part of the bed frame.

Such reinforcing structural members 18 are preferably configurated as illustrated, that is to say, as relatively deep, substantially U-shaped channels having similarly directed, longitudinal flanges 18a and 18b extending from the free ends of their respective legs. In this connection, it should be noted that the outer leg is somewhat shorter, so its flange 18a fits snugly under the flange 12d of the longéron, while the flange 18b of the longer leg fits snugly over the upper surfaces of the adjacent ends of the several beams 13 concerned. This configuration is advantageously achieved by suitably breaking, and bending a properly dimensioned steel plate.

The members 18 may be welded to the steel longérons 12 along the respective mating flanges 12d and 18a, and fastened to the received ends of the transverse beams 13 along respective flanges 18b, as by means of bolts 19.

The forward portion of a semi-trailer bed frame, such as that illustrated, is arranged for articulative attachment to a tractor unit in conventional fashion. To this end, the longérons 12 have their forward portions tapering, preferably arcuately, from bottom to top, as at 20, Fig. 2 and 4, and have forward extensions 21 of their respective transverse base webs 12c rising arcuately therewith, see Fig. 5.

Fitted into such forward portion of the bed frame is a transversely-extending secondary frame, indicated generally 22, Fig. 1, of rectangular configuration. This secondary frame 22 is made up of pairs of main frame members 23 and 24, respectively, which are of hollow, tubular formation having preferably square cross-sectional configuration, and, further, of a transverse series of mutually spaced longitudinal members 25 extending between and secured, as by welding, to the pair of transversely disposed main frame members 23. The longitudinal members 25 may be structural channel shapes, as illustrated, see Fig. 4.

The secondary frame 22 is preferably of somewhat less width than the bed frame proper, so that the pair of main frame members 23 seat directly upon the bearing flanges 12e along the upper edges of the respective inner upstanding webs 12b of the longérons 12. Securement thereto may be conveniently effected by means of welding.

Any suitable semi-trailer attachment unit, such as the conventional unit shown generally at 26, may be permanently secured to the front of the trailer bed frame proper by any convenient fastening means, desirably by welding.

The resulting trailer bed frame is strong and durable, yet considerably lighter in weight than those of conventional construction. It may be covered with a suitable surface flooring (not shown) for use as an open bed trailer, or may be provided with any suitable body in conventional fashion.

The embodiment illustrated in Fig. 8 is similar in all respects to the foregoing, except for the incorporation of longitudinal trusses within the hollow interior of the respective longérons. This is desirable in the construction of extra heavy duty equipment, where the length of the trailer bed is such as to make additional reinforcement advisable.

As shown, the truss of each longéron comprises, as a chord member, an elongate strip 30 of steel extending longitudinally of and dipping within the hollow interior of the longéron 12 so as to have a sloping rearward portion 30a, whose free rearward end is welded to the underside of the reinforcing structural member 18, a horizontal intermediate portion 30b, which is welded along its length to the base web 12c of the longéron, and a sloping forward portion 30c, whose free forward end is welded to the forward extension 21 of the base web. Such strip 30 need not be and preferably isn't sufficiently wide to abut laterally against the outer and inner upstanding webs 12a and 12b, respectively, of the longéron, nor is it secured thereto.

In the present instance, oppositely disposed sets of brace members 31 and 32, which meet at respective vertices and are welded together and to the chord member 30 thereat, and have their opposite ends fastened, as by means of bolts, to respective beams 13, are spaced apart by substantially the length of the horizontal chord portion 30b, and single brace members 33 extend vertically in mutually spaced relationship therebetween, interconnecting the chord member 30 with respective overlying beams 13. Such brace members are preferably short lengths of structural angles to give maximum strength to the construction.

Whereas this invention is here illustrated and described with respect to particular preferred embodiments thereof, it should be understood that various changes, apart from the mere substitution of equivalents, may be made therein and various other constructions may be adopted on the basis of the teachings hereof, by those skilled in the art, without departing from the protective scope of those of the following claims which are generic to the broader inventive concepts disclosed.

I claim:

1. In a trailer bed frame construction, a pair of mutually spaced longitudinal structural members, and a longitudinal series of mutually spaced beams extending transversely between and interconnecting said longitudinal structural members, each of said longitudinal structural members being formed as a deep girder for receiving end portions of said transverse beams, and comprising an outer, upstanding, longitudinal web, an inner, upstanding, longitudinal web of less depth than said outer web, and a transverse, longitudinal, base web longitudinally interconnecting the said upstanding webs, said beams seating upon the upper portion of the said inner upstanding web, and having their ends overlapped by and substantially abutting against the said outer upstanding web, means securing the respective beams to said outer upstanding web, and means securing the respective beams to said inner upstanding web.

2. The combination recited in claim 1, wherein the upstanding webs have respective inwardly projecting flanges providing extended bearing area for the beams, said beams resting upon the flange of the inner upstanding web of each longitudinal structural member, and being overlapped, above, by the flange of the outer upstanding web of each of said longitudinal structural members.

3. The combination recited in claim 2, wherein the outer upstanding web is substantially vertically disposed in the trailer bed frame, the base flange is substantially horizontally disposed, and the inner upstanding web diverges from the outer upstanding web as it rises from the base web.

4. The combination recited in claim 3, wherein the depth of each longitudinal structural member is considerably greater than the overall width thereof excluding said flanges.

5. The combination recited in claim 1, wherein the rearward portions of the longitudinal structural members lying above the rear wheel undercarriage have inserted within their upper portions, and secured thereto, respective elongate reinforcing members.

6. The combination recited in claim 1, wherein longitudinal truss members are disposed within and secured to the said longitudinal structural members.

7. A trailer bed frame construction, comprising a pair of longitudinal structural members defining substantially the length of the bed frame and spaced apart sidewise to define substantially the width of the bed frame, each of said members being formed as a deep girder for receiving end portions of transverse beams, and each comprising an outer, upstanding, longitudinal web, an inner, upstanding, longitudinal web of less depth than said outer web, and a transverse, longitudinal, base web longitudinally interconnecting the said upstanding webs to define therewith a channel formation; elongate structurel members secured within the upper portions of the rearward portions of the respective longitudinal structural members lying above the rear wheel undercarriage, as reinforcements, said reinforcing members leaving the upper part of the inner webs of the respective longitudinal structural members free for receiving transverse beams; and a longitudinal series of mutually spaced beams extending transversely between and interconnecting said longitudinal structural members, said beams seating upon the upper portions of the inner webs of said longitudinal structural members and those forwardly disposed having their ends overlapped by and substantially abutting against the outer web of said longitudinal structural members and those rearwardly disposed having their ends overlapped by and substantially abutting against the said reinforcing members.

8. The combination recited in claim 7, wherein the reinforcing members are of channel formation.

9. The combination recited in claim 8, wherein the inner upstanding webs of the said longitudinal structural members having respective inwardly projecting, substantially horizontal flanges providing extended bearing area upon which the said beams rest; and the said reinforcing members have respective substantially horizontal flanges projecting inwardly from the inner channel legs thereof and providing extended bearing area capping the said rearwardly disposed beams.

10. The combination recited in claim 9, wherein the outer upstanding webs of the said longitudinal structural members have respective inwardly projecting, substantially horizontal flanges providing extended bearing area capping the said forwardly disposed beams, and the said reinforcing members have respective substantially horizontal flanges projecting inwardly from the outer channel legs thereof, underlying the said flanges of the outer webs of the longtiudinal structural members and secured thereto.

11. The combination recited in claim 10, wherein longitudinal truss members are disposed within and secured to the said longitudinal structural members, and have their rearward ends secured to the respective reinforcing members.

12. The combination recited in claim 1, wherein the forward portion of the bed frame is provided by a separate structural frame of substantially rectangular configuration, disposed between and secured to the forward portions of said longitudinal structural members, said members being partially cut-away to accommodate said separate structural frame.

LARS R. LARSEN.

REFERENCES CITED

The following references are of record in the file of this patent:

UNITED STATES PATENTS

| Number | Name | Date |
| --- | --- | --- |
| 2,507,845 | Ziegler | May 16, 1950 |